(12) United States Patent
Larsen

(10) Patent No.: US 7,179,071 B1
(45) Date of Patent: Feb. 20, 2007

(54) COMPRESSION MOLDING CONTAINER PREFORMS

(75) Inventor: W. Bruce Larsen, Holland, OH (US)

(73) Assignee: Graham Packaging PET Technologies Inc., York, PA (US)

( * ) Notice: Subject to any disclaimer, the term of this patent is extended or adjusted under 35 U.S.C. 154(b) by 437 days.

(21) Appl. No.: 10/746,404

(22) Filed: Dec. 24, 2003

(51) Int. Cl.
B29C 49/22 (2006.01)
B29C 31/10 (2006.01)

(52) U.S. Cl. .............. 425/130; 425/256; 425/523; 425/528; 425/449

(58) Field of Classification Search ............ 425/130, 425/256, 258, 449, 523, 528, 573
See application file for complete search history.

(56) References Cited

U.S. PATENT DOCUMENTS

| | | | |
|---|---|---|---|
| 2,374,553 A * | 4/1945 | Miller | 264/40.4 |
| 3,278,992 A | 10/1966 | Strauss | |
| 3,299,475 A | 1/1967 | Carlson et al. | |
| 3,337,910 A | 8/1967 | West | |
| 3,375,553 A | 4/1968 | Criss | |
| 3,471,601 A * | 10/1969 | Goetgheluck | 425/547 |
| 3,586,748 A * | 6/1971 | Ayres | 264/515 |
| 3,661,489 A * | 5/1972 | Moore | 425/236 |
| 3,954,362 A * | 5/1976 | Boesch et al. | 425/130 |
| 4,122,147 A * | 10/1978 | Vrcelj | 264/255 |
| 4,141,470 A | 2/1979 | Schulte et al. | |
| 4,265,852 A * | 5/1981 | Sauer | 264/512 |
| 4,315,888 A | 2/1982 | Hafele | |
| 4,327,052 A * | 4/1982 | Sauer | 264/512 |
| 4,332,335 A | 6/1982 | Florentini | |
| 4,529,372 A * | 7/1985 | Saumsiegle | 425/528 |
| 4,883,645 A | 11/1989 | Pontius et al. | |
| 5,030,080 A | 7/1991 | Fukuda et al. | |
| 5,185,117 A | 2/1993 | Hawley | |
| 5,344,299 A | 9/1994 | Takeuchi | |
| 5,591,384 A | 1/1997 | Abrams et al. | |
| 5,762,854 A | 6/1998 | Valyi | |
| 5,798,128 A | 8/1998 | Dumazet et al. | |
| 5,800,757 A | 9/1998 | Abrams et al. | |
| 5,849,224 A | 12/1998 | Valyi | |
| 5,941,054 A | 8/1999 | Valyi | |
| 5,971,740 A | 10/1999 | Rees | |
| 6,045,736 A | 4/2000 | Hanot et al. | |
| 6,083,449 A | 7/2000 | Rees | |
| 6,190,586 B1 | 2/2001 | Abrams et al. | |
| 6,716,386 B2 * | 4/2004 | Saito et al. | 264/532 |
| 2002/0098310 A1 | 7/2002 | Kilkuchi et al. | |

* cited by examiner

FOREIGN PATENT DOCUMENTS

JP          59054510 A          3/1984

*Primary Examiner*—Robert B. Davis
(74) *Attorney, Agent, or Firm*—Rissman Jobse Hendricks & Oliverio, LLP

(57) ABSTRACT

An apparatus for supplying a mold charge for a mold cavity in accordance with one aspect of the present invention includes a mold charge chamber having a longitudinal dimension and at least two lateral inlets for supplying resin materials to the chamber such that the materials are stratified longitudinally of the chamber. A plunger is movable longitudinally into the chamber to force the stratified materials out of the chamber and thereby provide a stratified mold charge for a mold cavity. The at last two lateral inlets to the chamber preferably are spaced from each other lengthwise of the chamber. In one embodiment, the plunger has a contoured end for imparting a contour to the mold charge as the mold charge is forced from the chamber. A gate preferably is positioned at an end of the chamber remote from the plunger for selectively closing the chamber for filling and opening the chamber for discharge of the mold charge.

16 Claims, 2 Drawing Sheets

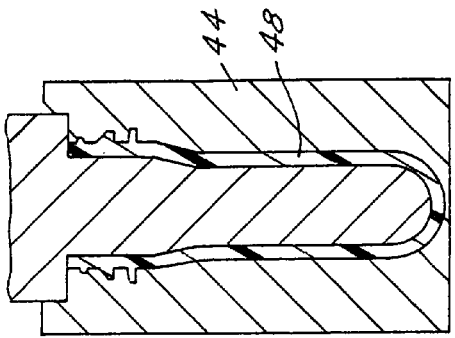
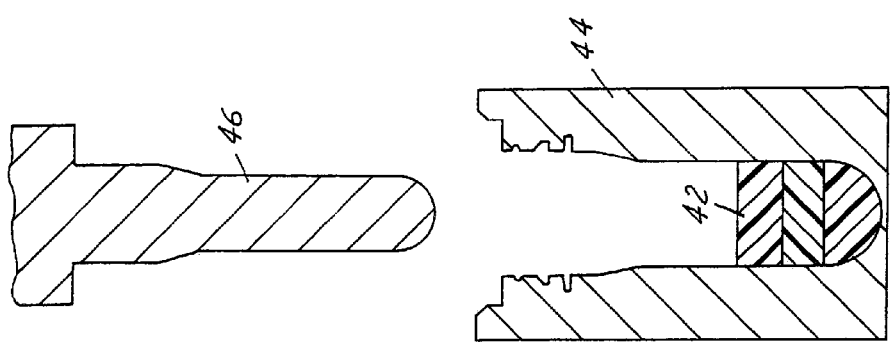
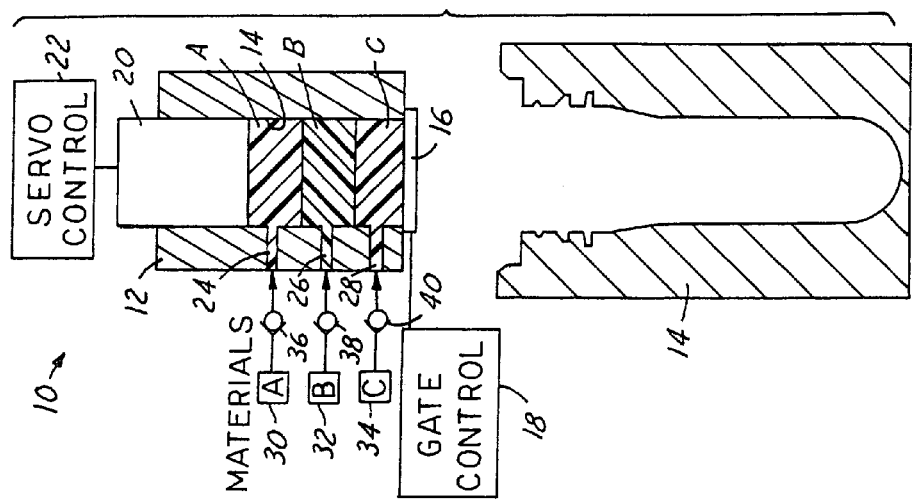

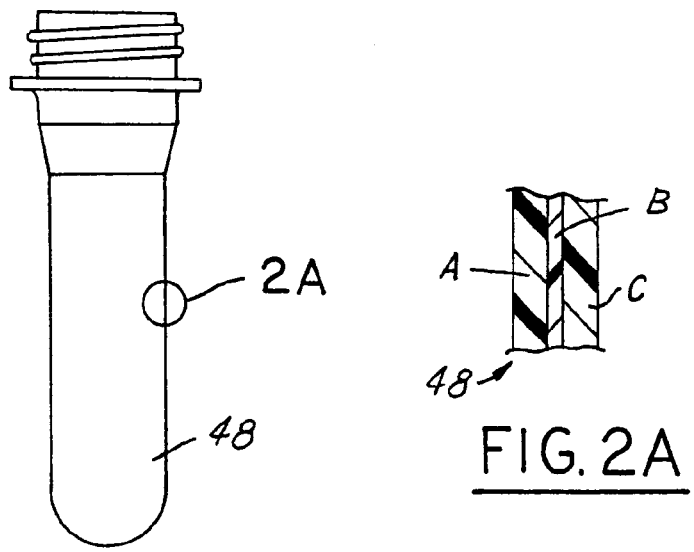
FIG. 2
FIG. 2A
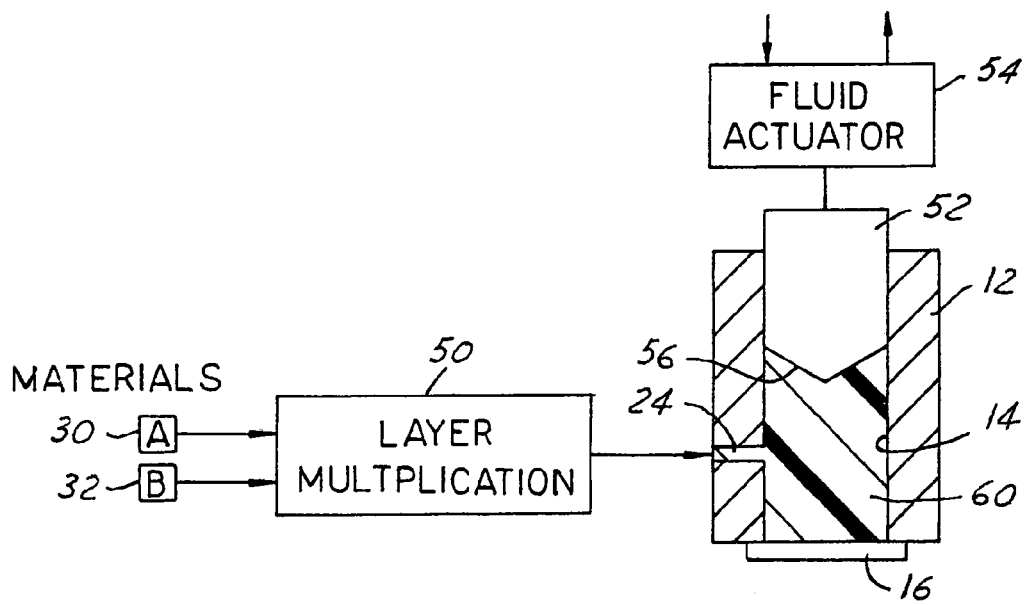
FIG. 3
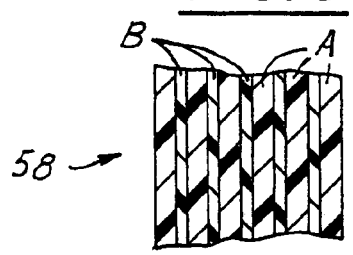
FIG. 4

COMPRESSION MOLDING CONTAINER PREFORMS

The present invention relates to compression molding preforms for subsequent blow molding as plastic containers, and more particularly to an apparatus and method for feeding a plastic resin mold charge into a mold cavity for compression molding a container preform.

BACKGROUND AND SUMMARY OF THE INVENTION

In compression molding a preform for subsequent blow molding as a plastic container, a mold charge is fed to a female compression mold cavity and a male mold core is inserted into the cavity to form the mold charge into a preform. This preform is subsequently blow molded to form a plastic container. The mold charge typically is fed to the mold cavity using a transfer wheel or the like that obtains a mold charge from the outlet of an extruder or other melt-phase transfer mechanism, and then releases the mold charge to fall by gravity into the female mold cavity. This transfer wheel and gravity drop technique is not sufficiently fast for high-speed production of preforms and containers, and does not consistently result in the desired placement and orientation of the mold charge within the mold cavity. It is a general object of the present invention to provide an apparatus and a method that reduce mold charge transfer time as compared with the prior art, and increase the accuracy of placement and orientation of the mold charge within the mold cavity.

An apparatus for supplying a mold charge for a mold cavity in accordance with one aspect of the present invention includes a mold charge chamber having a longitudinal dimension and at least two lateral inlets for supplying resin materials to the chamber such that the materials are stratified longitudinally of the chamber. A plunger is movable longitudinally into the chamber to force the stratified materials out of the chamber and thereby provide a stratified mold charge for a mold cavity. The at last two lateral inlets to the chamber preferably are spaced from each other lengthwise of the chamber. In one embodiment, the plunger has a contoured end for imparting a contour to the mold charge as the mold charge is forced from the chamber. A gate preferably is positioned at an end of the chamber remote from the plunger for selectively closing the chamber for filling and opening the chamber for discharge of the mold charge.

Apparatus for compression molding preforms for blow molding plastic containers in accordance with another aspect of the present invention includes a mold charge chamber having a longitudinal dimension and a lateral dimension that is uniform throughout the length of the chamber. At least one lateral input to the chamber is connected to a source of resin material to fill the chamber. A plunger has a lateral dimension substantially equal to the lateral dimension of the chamber, and is movable between a first position that closes an upper end of the chamber and a second position in which the plunger substantially fills the chamber. A gate is positioned at an end of the chamber remote from the plunger for selectively closing the chamber for filling and opening the chamber for discharge of a mold charge as the plunger moves toward the second position. A preform mold cavity is disposed to receive a mold charge discharged from the mold chamber, and a mold core is positioned to enter the mold cavity and compression mold a container preform. In one preferred embodiment of the invention, the at least one lateral inlet to the chamber includes at least two lateral inlets that are spaced from each other longitudinally of the chamber. The at least two inlets are connected to associated sources of plastic resin material for supplying resin to the chamber in such a way that the materials are stratified longitudinally of the chamber. The mold charge supplied to the mold cavity is thus stratified longitudinally of the mold charge, and is adapted for compression molding preforms having layers of material corresponding to the material stratification in the mold charge.

BRIEF DESCRIPTION OF THE DRAWINGS

The invention, together with additional objects, features, advantages and aspects thereof, will be best understood from the following description, the appended claims and the accompanying drawings, in which:

FIG. 1A is a schematic diagram of an apparatus for supplying a mold charge to a mold cavity in accordance with one exemplary embodiment of the invention;

FIGS. 1B and 1C are schematic diagrams that illustrate sequential stages of operation of the apparatus following the stage of in FIG. 1A;

FIG. 2 is en elevational view of an exemplary preform made with the apparatus of FIGS. 1A–1C;

FIG. 2A is a fragmentary sectional view of the portion of the preform within the area 2A in FIG. 2;

FIG. 3 is a schematic diagram that shows a modification to the apparatus of FIG. 1A; and FIG. 4 is a sectional view that is similar to that of FIG. 2A but illustrates the layered construction of a preform obtained when employing the modification of FIG. 3.

DETAILED DESCRIPTION OF PREFERRED EMBODIMENTS

FIGS. 1A–1C illustrate an apparatus 10 in accordance with one exemplary embodiment of the invention. A housing or block 12 has an internal cavity that forms a mold charge chamber 14. Chamber 14 has a longitudinal dimension, and has a lateral dimension that is uniform throughout the length of the chamber. Chamber 14 may be of cylindrical geometry, for example. A gate 16 is positioned at the lower end of block 12, and is movable under control of a gate control 18 between the position illustrated in FIG. A in which gate 16 closes the lower end of chamber 14 and a second position in which the gate opens the lower end of the chamber. A plunger 20 is disposed within chamber 14. Plunger 20 is movable by a servo control 22 between a first position illustrated in FIG. 1A in which plunger 20 closes the upper end of chamber 14, and a second position in which plunger 20 is moved through the chamber to the lower end of the chamber so as substantially to fill the chamber. (Directional words such as "upper" and "lower" are employed by way of description and not limitation with respect to the upright orientations of the components illustrated in the drawings.)

At least one lateral material inlet extends from chamber 14 through block 12. In the exemplary preferred embodiment of the invention illustrated in FIG. 1A, at least two and preferably three lateral inlets 24, 26, 28 extend from chamber 14 and are longitudinally spaced from each other lengthwise of chamber 14. Each inlet 24, 26, 28 is connected to an associated source 30, 32, 34 of resin materials A, B and C. Sources 30–34 preferably are connected to inlets 24–28 through associated valves 36, 38, 40 or the like for preventing back-flow of material from chamber 14. With actuator 20 lifted or retracted to the upper or first position illustrated in FIG. 1, and with gate 16 closed, materials A, B and C are injected into cavity 14, preferably substantially simultaneously. In this way, the materials A, B and C are stratified longitudinally of chamber 14, as illustrated in FIG. 1A.

With chamber 14 so filled, gate 16 is opened and plunger 20 is moved downwardly into the chamber to discharge the stratified mold charge 42 (FIG. 1B) into the female preform mold 44. This downward motion of plunger 20 preferably is very rapid, so that mold charge 42 is "shot" into cavity 44. The resin layers of mold charge 42 are soft, so mold charge conforms to and fills the lower end of the mold cavity. Cavity 44 is then positioned in alignment with a male mold core 46 (or mold core 46 is moved into alignment with cavity 44) and core 46 is moved into cavity 44 (FIG. 1C) to compression mold mold charge 42 into a compression molded preform 48. As shown in FIGS. 2 and 2A, this compression molded preform 48 has a layered wall construction in which the stratified materials A, B and C of the mold charge 42 form the inner, intermediate and outer layers of the preform. Materials A, B and C may be selected to achieve the desired preform material construction. For example, materials A and C may be virgin polyethylene terephthalate (PET), while material B may be a suitable barrier resin such as nylon or ethylene vinyl alcohol (EVOH). In an alternative implementation, materials A and C may be different materials, such as virgin PET and post consumer resin (PCR), for example.

FIGS. 3 and 4 illustrate another exemplary embodiment of the invention in which materials A and B are fed from sources 30, 32 through a layer multiplication device 50. Exemplary layer multiplication devices are disclosed in U.S. Pat. Nos. 5,094,793, 5,202,074, 5,380,479 and 5,628,950. Device 50 forms a stream of resin material in which the two materials A and B are in multiple alternate layers. Additional materials may also be employed for additional layers, such as layers of adhesive between the alternate layers of materials A and B. The output of layer multiplier 50 is fed to the inlet 24 of chamber 14. FIG. 3 also illustrates a modification in which the plunger 52 is coupled to a fluid actuator 54, which may comprise a suitable pneumatic or hydraulic fluid actuation device. The lower end 56 of plunger 52 is contoured in this embodiment to impart a contour to the mold charge as it is ejected from chamber 14, which can be of assistance in maintaining the layered construction during the compression molding operation. FIG. 4 illustrates the sidewall construction of a preform 58 produced from the mold charge 60 in FIG. 3, in which there are multiple layers of material A alternating with multiple layers of material B. Material A may comprise PET and material B may comprise barrier resin such as EVOH or nylon. Where adhesive material is desired between the alternate layers, the adhesive material may be blended with the barrier resin B, or may be provided as additional layers as previously discussed.

There have thus been disclosed an apparatus and method for supplying a mold charge for compression molding container preforms that fully satisfy all of the objects and aims previously set forth. The invention has been disclosed in conjunction with two exemplary presently preferred embodiment thereof, and a number of modifications and variations have been discussed. Other modifications and variations will readily suggest themselves to persons of ordinary skill in the art. The invention is intended to embrace all such modifications and variations as fall within the spirit and broad scope of the appended claims.

The invention claimed is:

1. Apparatus for supplying a mold charge for a mold cavity, which includes:
   a mold charge chamber having a longitudinal dimension,
   at least two lateral inlets to said chamber for supplying plastic resin materials to said chamber such that said materials are stratified longitudinally of said chamber, and
   a plunger movable longitudinally into said chamber to force said stratified materials out of said chamber and thereby provide a stratified mold charge for a mold cavity.

2. The apparatus set forth in claim 1 wherein said at least two lateral inlets to said chamber are spaced from each other lengthwise of said chamber.

3. The apparatus set forth in claim 1 wherein said plunger has a contoured end for imparting a contour to said mold charge as said mold charge is forced from said chamber.

4. The apparatus set forth in claim 1 further comprising an actuator coupled to said plunger for moving said plunger into said chamber.

5. The apparatus set forth in claim 4 wherein said actuator is selected from the group consisting of an electrical servo actuator and a fluid actuator.

6. Apparatus for supplying a mold charge to a mold cavity, which includes:
   a mold charge chamber having a longitudinal dimension and a lateral dimension that is uniform longitudinally of said chamber,
   at least one lateral inlet to said chamber for supplying at least two plastic resin materials to said chamber in such a way that said materials are stratified longitudinally of said chamber,
   a plunger having a lateral dimension that is substantially equal to that of said chamber and being movable longitudinally into said chamber to force said stratified materials out of said chamber and thereby provide a stratified mold charge for a mold cavity, and
   a gate at an end of said chamber remote from said plunger for selectively closing said chamber for filling and opening said chamber for discharge of a mold charge.

7. The apparatus set forth in claim 6 wherein said plunger has a contoured end for imparting a contour to said mold charge as said mold charge is forced from said chamber.

8. The apparatus set forth in claim 6 wherein said at least one lateral inlet to said chamber comprises at least two inlets that are spaced from each other lengthwise of said chamber.

9. The apparatus set forth in claim 6 further includes a layer multiplier having inlets for receiving at least two resin materials and an outlet coupled to said inlet of said chamber.

10. Apparatus for supplying a mold charge for a mold cavity, which includes:
    a mold charge chamber having a longitudinal dimension,
    at least one inlet to said chamber for supplying plastic resin materials to said chamber such that said materials are stratified longitudinally of said chamber, and
    a plunger movable longitudinally of said chamber to force said material out of said chamber and thereby provide a mold charge for a mold cavity,
    said plunger having a contoured end for imparting a contour to said mold charge as said mold charge is forced from said cavity.

11. The apparatus set forth in claim 10 wherein said at least one inlet includes at least two lateral inlets to said chamber for supplying at least two resin materials to said chamber in such a way that said materials are stratified longitudinally of said chamber.

12. The apparatus set forth in claim 10 further includes a layer multiplier having inlets for receiving at least two resin materials and an outlet coupled to said inlet of said chamber.

13. The apparatus set forth in claim 10 further including a gate at an end of said chamber remote from said plunger for selectively closing said chamber for filling and opening said chamber for discharge of said mold charge.

14. Apparatus for compression molding preforms for blow molding plastic containers, which includes:

a mold charge chamber having a longitudinal dimension and a lateral dimension that is uniform longitudinally of said chamber, at least one lateral inlet to said chamber for supplying plastic resin materials to fill said chamber such that said materials are stratified longitudinally of said chamber, a plunger having a lateral dimension substantially equal to that of said chamber, said plunger being movable between a first position that closes an upper end of said chamber and a second position in which said plunger substantially fills said chamber, a gate at an end of said chamber remote from said plunger for selectively closing said chamber for filling through said inlet and opening said chamber for discharge of a mold charge as said plunger moves to said second position, a preform mold cavity disposed to receive a mold charge discharged from said chamber, and a mold core for entering said mold cavity and compression molding a container preform.

15. The apparatus set forth in claim 14 wherein said at least one lateral inlet includes at least two lateral inlets spaced from each other longitudinally of said chamber, and wherein said apparatus further includes at least two sources of plastic resin materials coupled to respective ones of said inlets for supplying said plastic resin materials to said chamber in such a way that said materials are stratified longitudinally of said chamber.

16. The apparatus set forth in claim 14 wherein said plunger has a contoured end for imparting a contour to said mold charge as said mold charge is forced from said chamber.

* * * * *